United States Patent [19]
Alexander et al.

[11] Patent Number: 5,785,375
[45] Date of Patent: Jul. 28, 1998

[54] RETRACTABLE HARD-TOP FOR AN AUTOMOTIVE VEHICLE

[75] Inventors: Michael P. Alexander, Gross Ile; Albert W. Harrison, III, W. Bloomfield; Christopher I. Ito, Canton, all of Mich.; Darin Kirschner, Stevenson Ranch, Calif.

[73] Assignee: ASC Incorporated, Southgate, Mich.

[21] Appl. No.: 826,067

[22] Filed: Mar. 24, 1997

Related U.S. Application Data

[63] Continuation of Ser. No. 521,276, Aug. 30, 1995, abandoned, which is a continuation of Ser. No. 175,150, Dec. 29, 1993, abandoned.

[51] Int. Cl.⁶ .................................................. B60J 7/14
[52] U.S. Cl. ........................ 296/108; 296/117; 296/136
[58] Field of Search .................................. 296/107, 108, 296/116, 117, 136, 146.14

[56] References Cited

U.S. PATENT DOCUMENTS

| | | |
|---|---|---|
| 404,405 | 6/1889 | Haughey . |
| 1,184,734 | 5/1916 | Freeman . |
| 1,748,736 | 2/1930 | Selje . |
| 1,784,279 | 12/1930 | Ellerbeck . |
| 1,988,346 | 1/1935 | Wagner .................. 296/107 |
| 2,007,873 | 7/1935 | Paulin ..................... 296/117 |
| 2,076,243 | 4/1937 | Marshall et al. ....... 296/107 |
| 2,564,446 | 8/1951 | Parsons . |
| 2,580,486 | 1/1952 | Vigmostad . |
| 2,596,355 | 5/1952 | Ackermans ............. 296/107 |
| 2,704,225 | 3/1955 | Anschuetz et al. ..... 296/107 |
| 2,747,928 | 5/1956 | Olivier et al. .......... 296/107 |
| 2,768,024 | 10/1956 | Spear, Jr. ............... 296/107 |
| 2,768,025 | 10/1956 | Spear, Jr. et al. ...... 296/117 |
| 2,770,489 | 11/1956 | Garvey et al. ......... 296/117 |
| 2,841,441 | 7/1958 | Evans ..................... 296/117 |
| 2,856,231 | 10/1958 | Zeman ................... 296/117 |
| 2,869,923 | 1/1959 | Mulichak ............... 296/117 |
| 2,919,156 | 12/1959 | Dodge ..................... 296/107 |
| 2,939,742 | 6/1960 | Dardarian et al. ...... 296/107 |
| 3,059,962 | 10/1962 | Harms et al. ........... 296/117 |
| 3,357,738 | 12/1967 | Bourlier . |

(List continued on next page.)

FOREIGN PATENT DOCUMENTS

| | | |
|---|---|---|
| 493260 | of 0000 | Belgium . |
| 0261379 A2 | 4/1987 | European Pat. Off. . |
| 0246201 | 11/1987 | European Pat. Off. . |
| 0494366 A2 | 7/1992 | European Pat. Off. . |
| 557699 | 8/1923 | France . |
| 753940 | 10/1933 | France . |
| 774595 | 12/1934 | France . |
| 1049026 | 12/1953 | France . |
| 31 27 525 A1 | 1/1983 | Germany . |
| 3416286 | 10/1984 | Germany . |
| 33 42 915 A1 | 6/1985 | Germany . |
| 3635373 A1 | 4/1988 | Germany . |
| 3635887 A1 | 5/1988 | Germany . |
| 3733892 A | 4/1989 | Germany . |
| 3816060 A | 11/1989 | Germany . |

(List continued on next page.)

OTHER PUBLICATIONS

Picture of a 1957 Ford Fairlane retractable hardtop convertible, *The Detroit News*, Apr. 6, 1994.

Viper Pure Performance by Dodge/Auto Editors of Consumer Guide®, Publications International, Ltd., pp. 6 and 7, 1993.

P. 75 from *Automotive Industries*, Feb. 1990, showing "C&C Intrigue".

*Primary Examiner*—Dennis H. Pedder
*Attorney, Agent, or Firm*—Harness, Dickey & Pierce, P.L.C.

[57] ABSTRACT

A retractable hard-top roof for an automotive vehicle is comprised of a rigid front roof section which is retractable upon a rear roof section for horizontal stowage between the front seat and the trunk. Another aspect of a retractable roof provides for a floating pivot.

63 Claims, 11 Drawing Sheets

U.S. PATENT DOCUMENTS

| | | | |
|---|---|---|---|
| 3,375,037 | 3/1968 | Hunt, Jr. | 296/117 |
| 3,377,099 | 4/1968 | Podolan | 296/136 |
| 3,575,464 | 4/1971 | Himka et al. | 296/117 |
| 3,994,524 | 11/1976 | Lehmann | 296/107 |
| 4,168,859 | 9/1979 | Breitschwerdt et al. | 296/102 X |
| 4,634,171 | 1/1987 | McKeag | 296/108 |
| 4,712,828 | 12/1987 | Albrecht | 296/121 |
| 4,720,133 | 1/1988 | Alexander et al. | 296/117 |
| 4,729,592 | 3/1988 | Tuchiya et al. | 296/116 |
| 4,746,163 | 5/1988 | Muscat | 296/107 X |
| 4,784,428 | 11/1988 | Moy et al. | 296/107 |
| 4,854,634 | 8/1989 | Shiraishi et al. | 296/108 |
| 4,895,409 | 1/1990 | Konishi et al. | 296/107 |
| 4,936,626 | 6/1990 | Gmeiner et al. | 296/108 |
| 4,950,022 | 8/1990 | Pattee | 296/107 |
| 4,984,841 | 1/1991 | Bauer et al. | 296/118 |
| 5,004,291 | 4/1991 | Bauer et al. | 296/116 |
| 5,033,789 | 7/1991 | Hayashi et al. | 296/216 |
| 5,067,768 | 11/1991 | Fischbach | 296/107 |
| 5,090,764 | 2/1992 | Kogawa et al. | 296/107 |
| 5,118,158 | 6/1992 | Truskolaski | 296/107 |
| 5,161,852 | 11/1992 | Alexander et al. | 296/108 |
| 5,195,798 | 3/1993 | Klein et al. | 296/107 X |
| 5,207,474 | 5/1993 | Licher et al. | 296/107 |
| 5,225,747 | 7/1993 | Helms et al. | 296/107 X |
| 5,429,409 | 7/1995 | Corder et al. | 296/108 |
| 5,490,709 | 2/1996 | Rahn | 296/122 |
| 5,520,432 | 5/1996 | Gmeiner et al. | 296/107 |
| 5,533,777 | 7/1996 | Kleemann et al. | 296/117 |
| 5,542,735 | 8/1996 | Furst et al. | 296/107 |

FOREIGN PATENT DOCUMENTS

| | | |
|---|---|---|
| 4010276 A1 | 10/1990 | Germany . |
| 41 13 616 C1 | 7/1992 | Germany . |
| 9108242 | 12/1992 | Germany . |
| 4211918 C1 | 3/1993 | Germany . |
| 4134606 A1 | 4/1993 | Germany . |
| 4218380 C1 | 5/1993 | Germany . |
| 43 07 158 C1 | 4/1994 | Germany . |
| 4311240 C1 | 4/1994 | Germany . |
| 43 20 603 A1 | 1/1995 | Germany . |
| 43 24 708 A1 | 1/1995 | Germany . |
| 44 38 191 C1 | 7/1995 | Germany . |
| 44 38 190 C1 | 11/1995 | Germany . |
| 44 31 656 C1 | 12/1995 | Germany . |
| 4445580 C1 | 12/1995 | Germany . |
| 4445941 C1 | 3/1996 | Germany . |
| 4445944 C1 | 4/1996 | Germany . |
| 195 17 063 C1 | 6/1996 | Germany . |
| 4446483 A1 | 6/1996 | Germany . |
| 44 45 920 A1 | 7/1996 | Germany . |
| 195 14 022 C1 | 9/1996 | Germany . |
| 195 34 584 C1 | 9/1996 | Germany . |
| 19518071 A1 | 11/1996 | Germany . |
| 19532568 C1 | 11/1996 | Germany . |
| 19532567 C1 | 12/1996 | Germany . |
| 430910 | 2/1948 | Italy . |
| 2-144226 | 4/1990 | Japan . |
| 650980 | 8/1985 | Switzerland . |
| 413467 | 7/1934 | United Kingdom . |
| 756531 | 9/1956 | United Kingdom . |
| 2174759 | 3/1988 | United Kingdom . |
| 2257949 | 1/1993 | United Kingdom . |

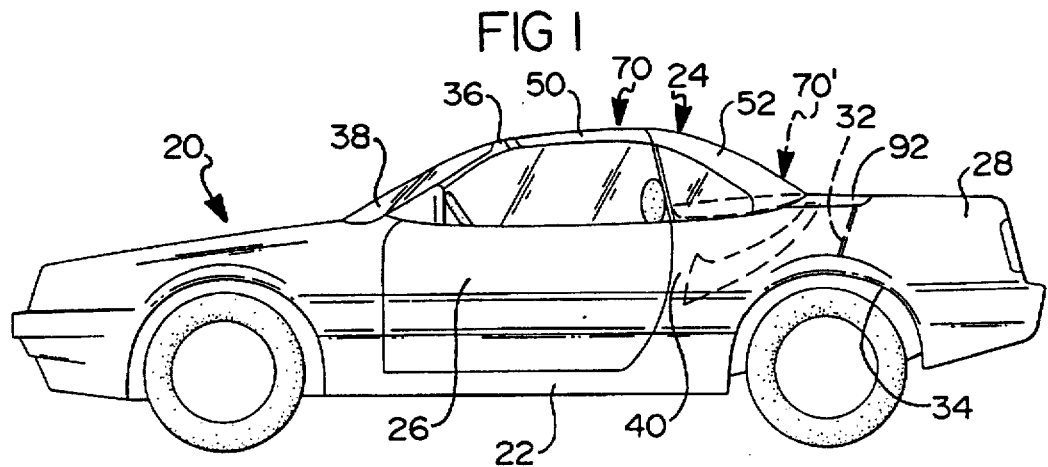
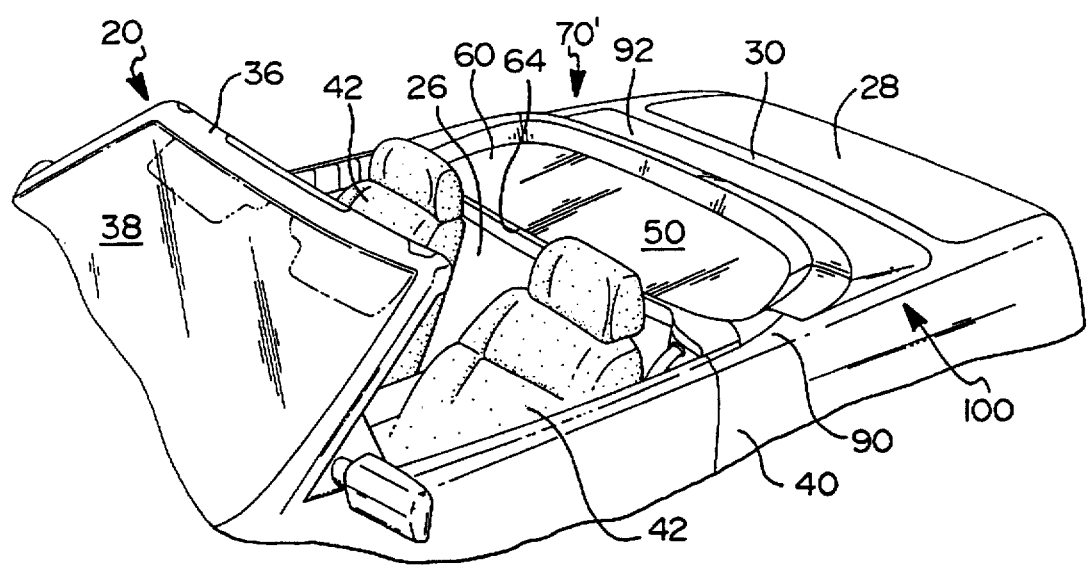

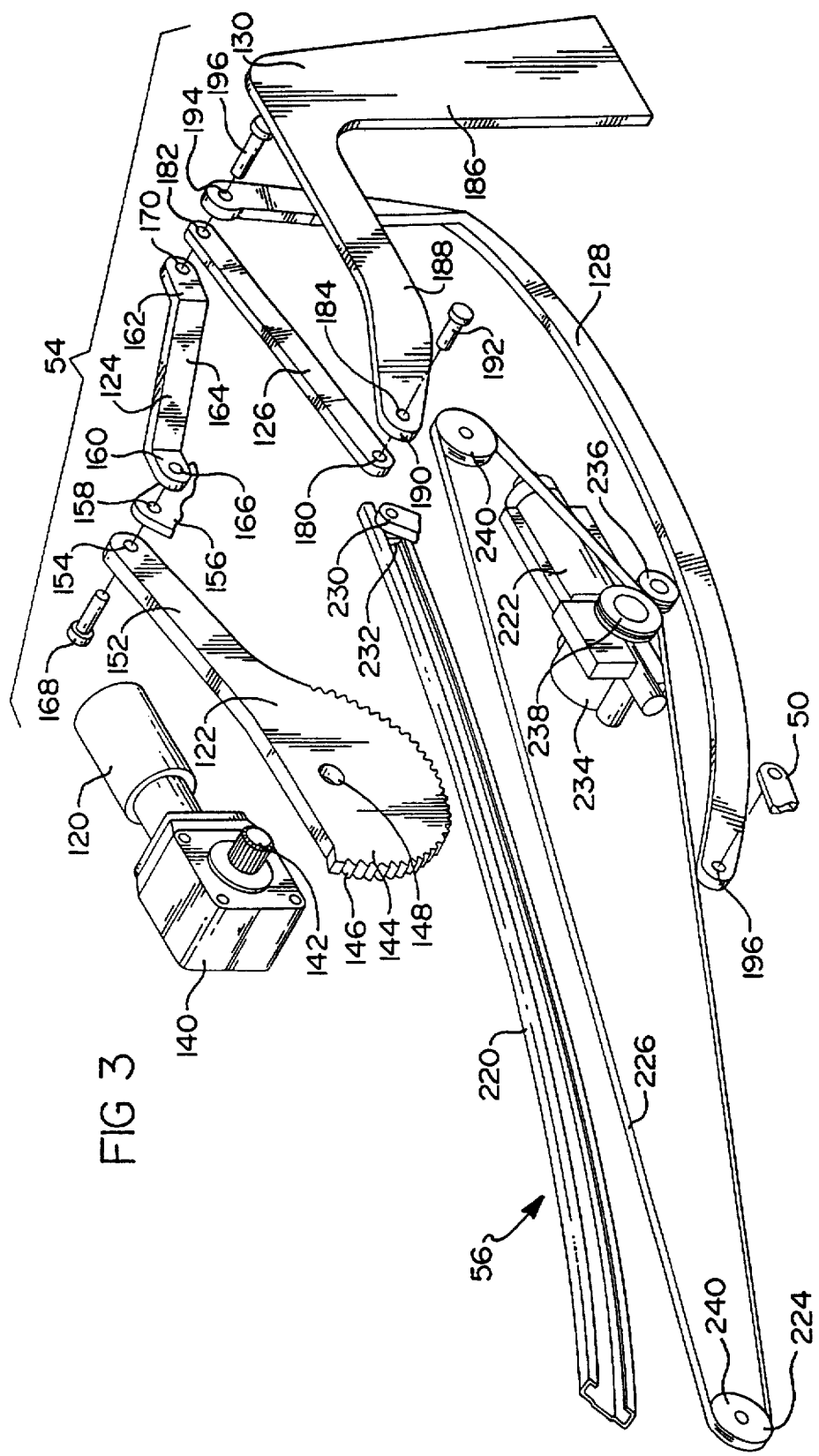

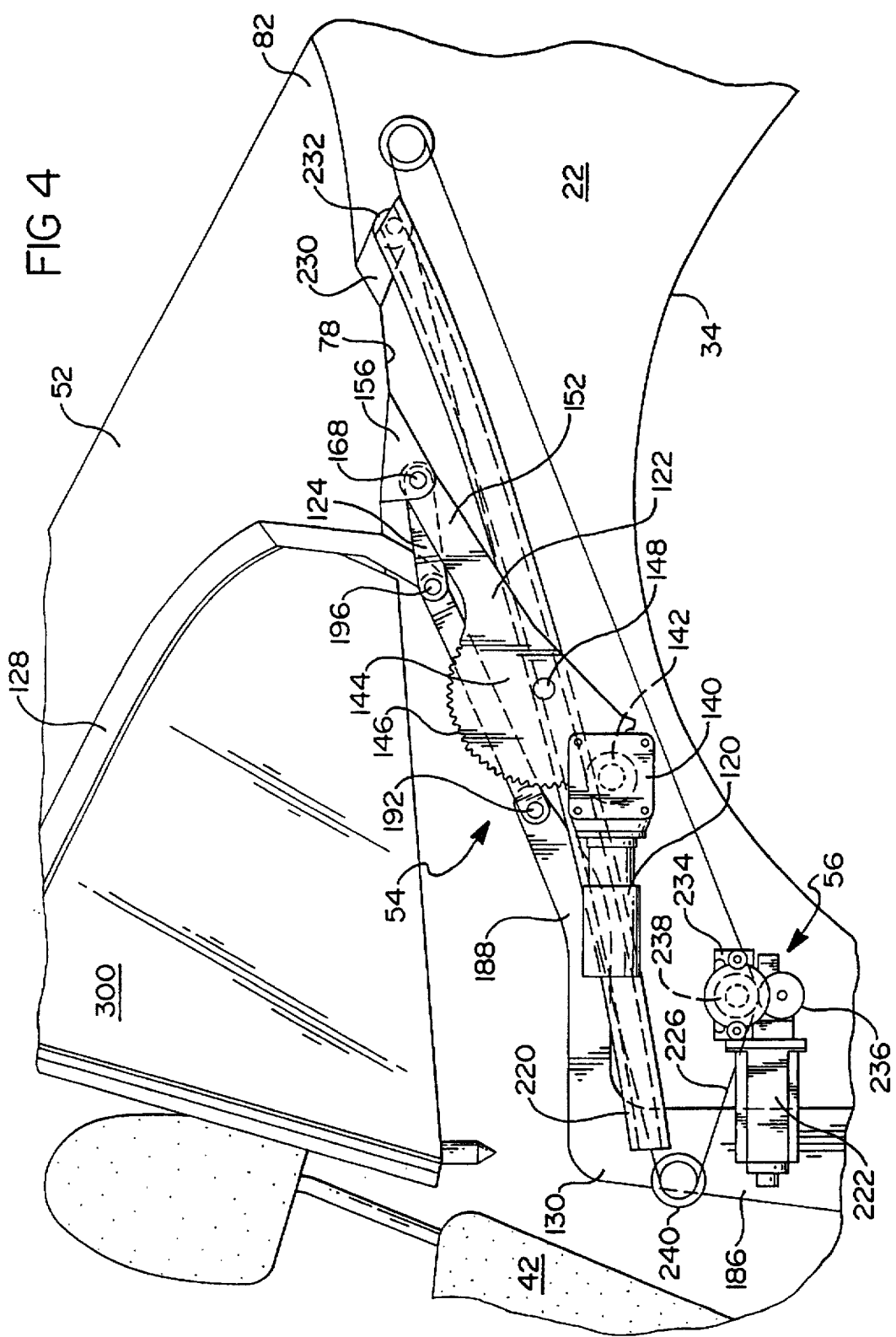

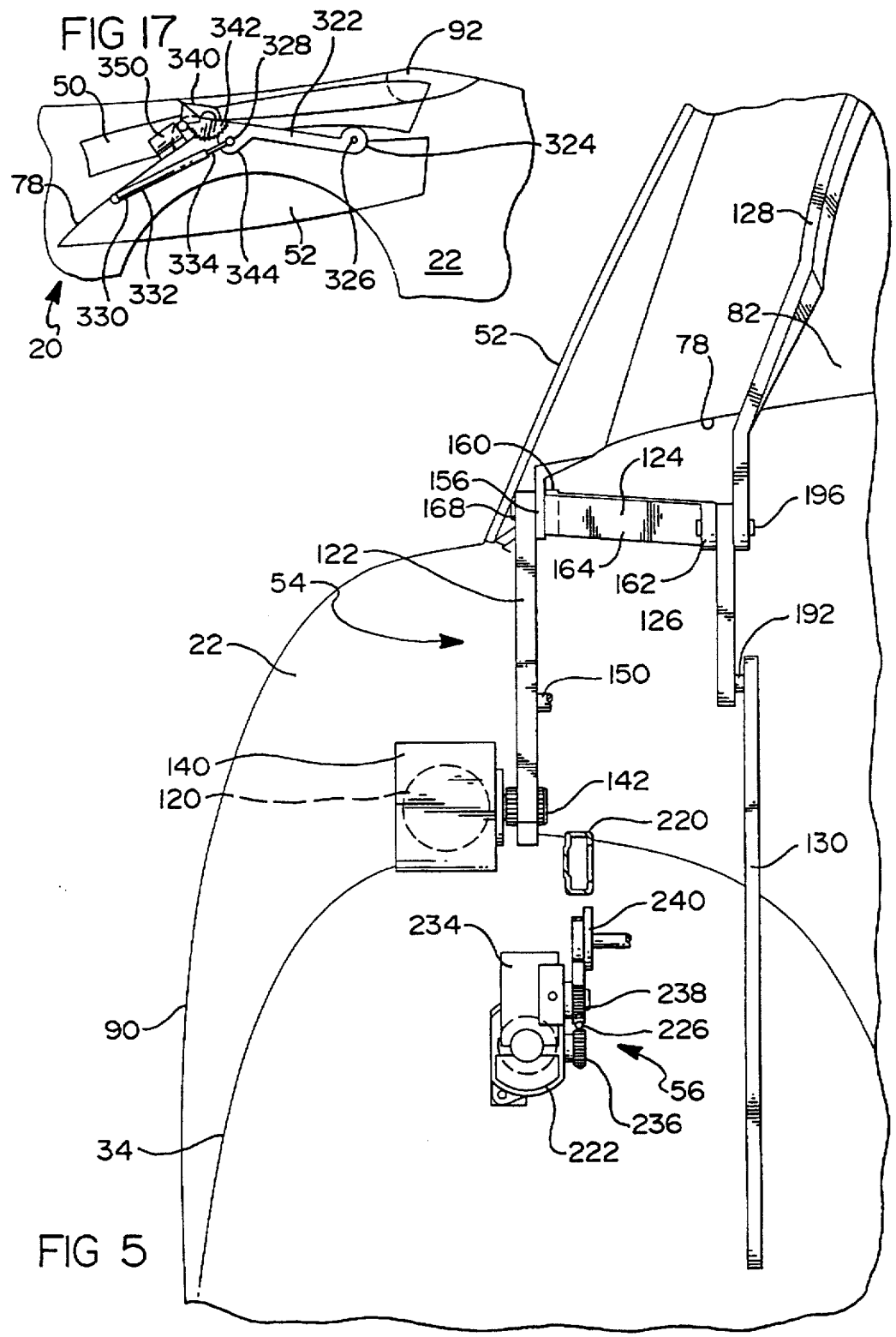

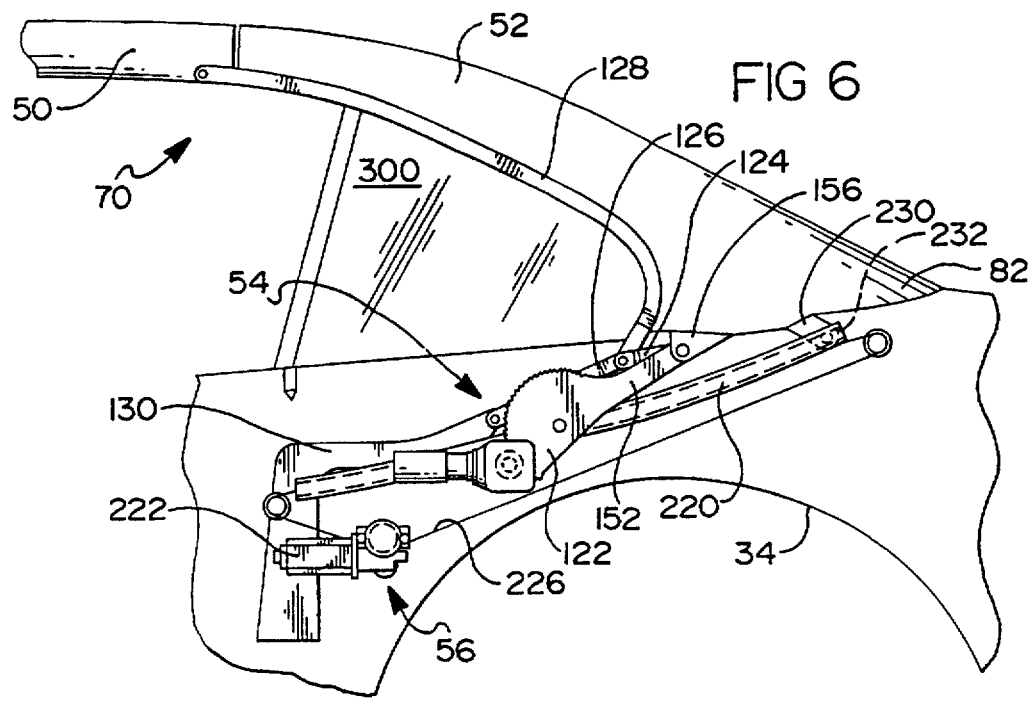
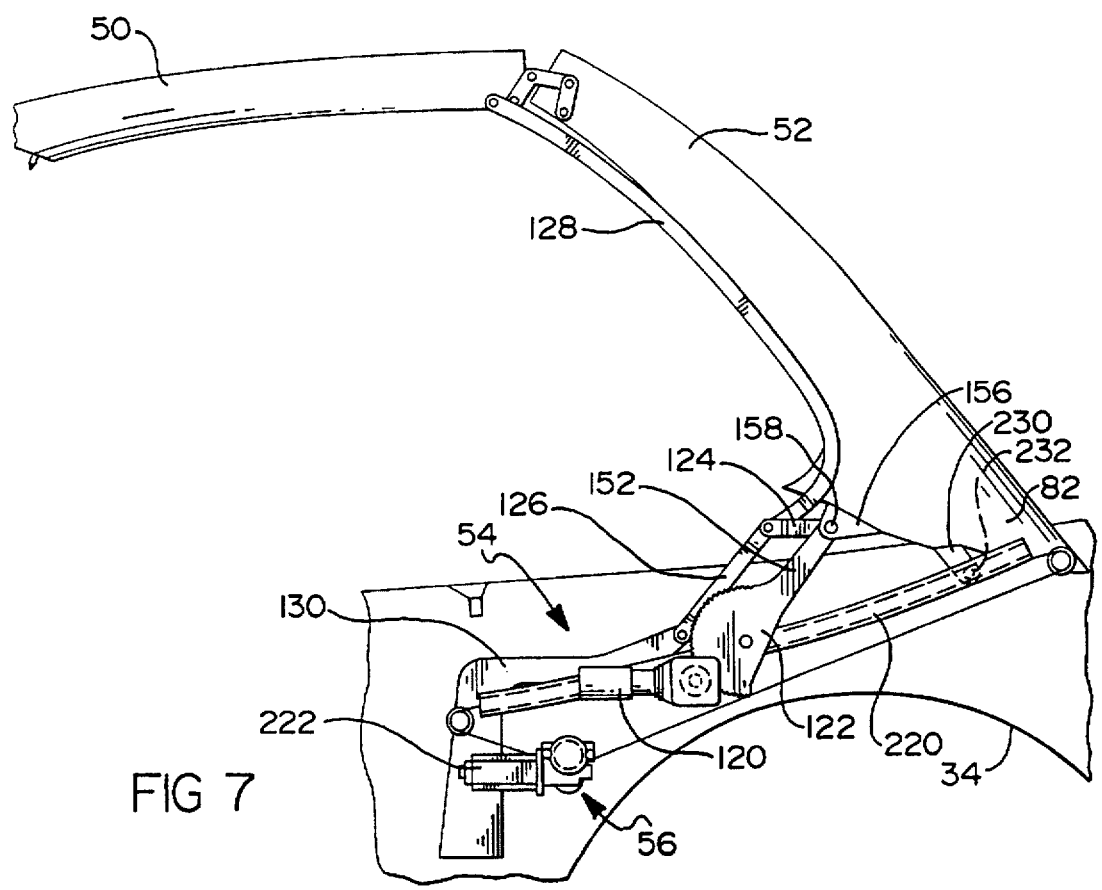

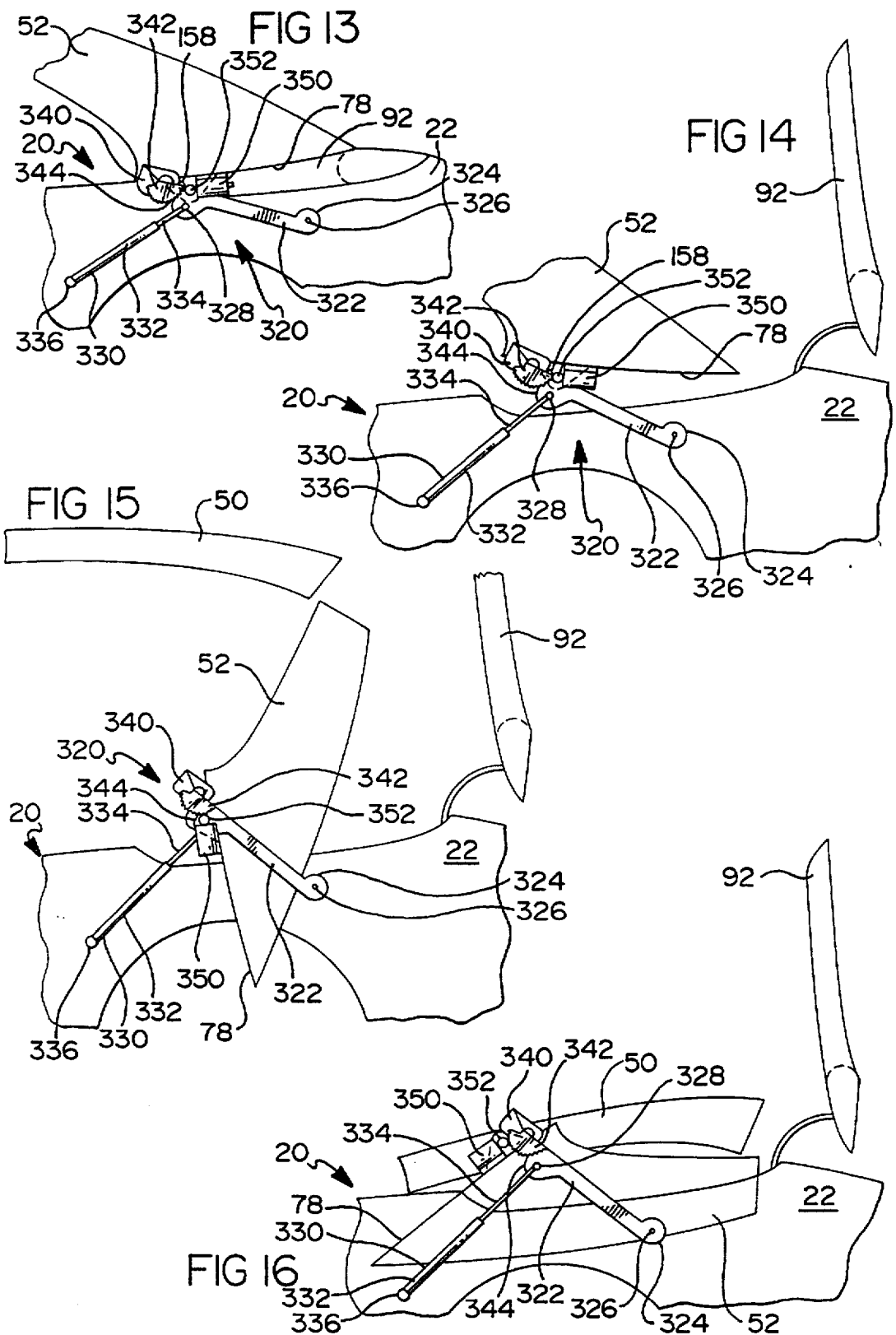

RETRACTABLE HARD-TOP FOR AN AUTOMOTIVE VEHICLE

This is a continuation of U.S. patent application Ser. No. 08/521,276 filed Aug. 30, 1995, now abandoned, pursuant to 37 C.F.R. §1.53, which is a continuation of Ser. No. 08/175,150 filed Dec. 29,1993, now abandoned.

BACKGROUND AND SUMMARY OF THE INVENTION

This invention relates generally to retractable roofs and specifically to a retractable hard-top roof for an automotive vehicle.

It is known to provide a retractable hard-top roof for a convertible automotive vehicle. Traditionally, such a retractable hard-top roof has been accomplished by employing a plurality of rigid roof panels which slide rearwardly over one another during retraction. Typically, these retracting roof panels are mechanically stowed in the trunk of the automotive vehicle. This system, however, often does not fully retract flush within the vehicle body and usually pre-empts storage space within the trunk.

More recently, various retractable roof systems have been developed which swing a rigid roof member into a passenger compartment of the automotive vehicle. Furthermore, these systems stow the retracted roof panels in a substantially vertical orientation behind either the front or rear seats. While these conventional systems maintain the storage space within the trunk, the retracted roof panels are often stored in an unsightly manner. Examples of two such systems are disclosed in U.S. Pat. No. 5,195,798 entitled "Retractable Roof For Vehicles" which issued to Klein et al. on Mar. 23, 1993, and U.S. Pat. No. 4,854,634 entitled "Upper Body Structure for a Convertible Vehicle" which issued to Shiraishi et al. on Aug. 8, 1989. Therefore, it would be desirable to have a retractable hard-top roof for an automotive vehicle which folds to an aesthetically pleasing horizontal position, clears a pair of obstructing wheel houses during retraction and maintains the storage space within the vehicle's trunk while avoiding the aforementioned problems.

In accordance with the present invention, the preferred embodiment of a new and useful retractable hard-top roof for an automotive vehicle is comprised of a front roof section which is retractable upon a rear roof section. Both the front and rear roof sections are retractable into an automotive vehicle body and are stowed in a substantially horizontal orientation. Furthermore, the front roof section is rigid in construction.

In another aspect of the present invention, a retractable roof system has a retraction mechanism which vertically displaces a rear roof pivot during retraction and extension of a rear roof section. In a further aspect of the present invention, a retractable roof system has a guiding mechanism for rotating the rear roof section about a rear roof pivot.

The present invention is advantageous over traditional designs in that the roof panels can be retracted to a stowed horizontal position which is aesthetically pleasing. Furthermore, the present invention is advantageous since the front and rear roof sections can be retracted and stowed within the passenger compartment so as to maintain the storage space within the vehicle's trunk. The present invention also provides a means for retracting and extending the front and rear roof sections clear of a pair of obtrusive rear wheel houses within the automotive vehicle body. Additional advantages and features of the present invention will become apparent from the following description and appended claims, taken in conjunction with the accompanying drawings.

BRIEF DESCRIPTION OF THE DRAWINGS

FIG. 1 is a side elevational view of a preferred embodiment of the retractable hard-top roof of the present invention in relation to an automotive vehicle;

FIG. 2 is a fragmentary perspective view of the retractable hard-top roof of the present invention of FIG. 1 shown in a fully retracted position in relation to the automotive vehicle;

FIG. 3 is an exploded perspective view showing a retraction mechanism and a guiding mechanism of the retractable hard-top roof of the present invention of FIG. 2;

FIG. 4 is a fragmentary side elevational view of the assembled retraction and guiding mechanisms of the retractable hard-top roof of the present invention of FIG. 3;

FIG. 5 is a fragmentary rear elevational view of the retraction and guiding mechanisms of the retractable hard-top roof of the present invention of FIG. 4;

FIGS. 6-12 are a series of fragmentary side elevational views showing the preferred embodiment of the retractable hard-top roof of the present invention of FIG. 4 in various sequential retracting positions; and FIGS. 13-17 are a series of fragmentary side elevational views showing various sequential retraction positions of an alternate embodiment of the retractable hard-top roof of the present invention.

DETAILED DESCRIPTION OF THE PREFERRED EMBODIMENT

Figure 8:
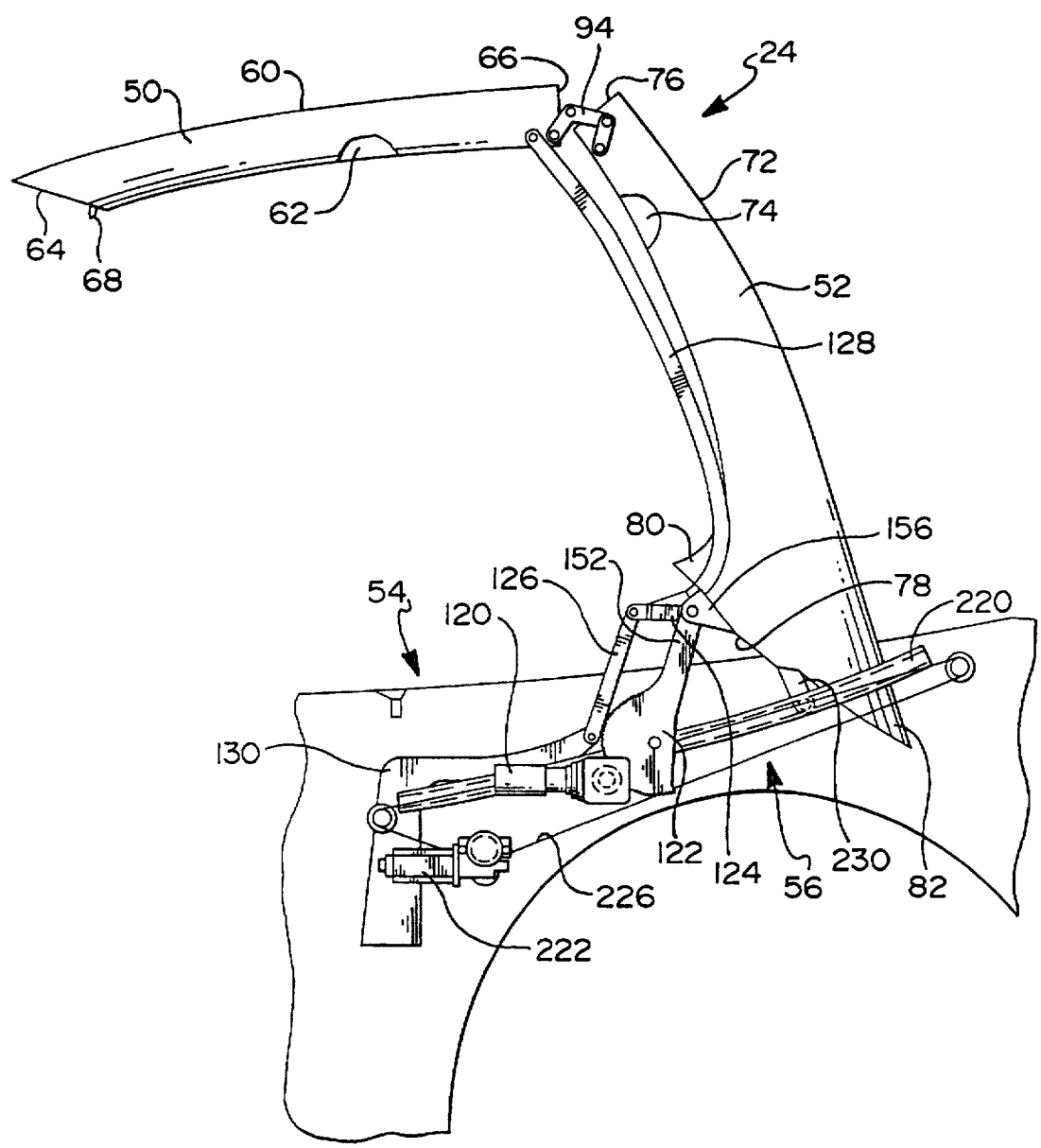

An automotive vehicle 20 is shown in FIGS. 1 and 2. Automotive vehicle 20 is constructed with a body 22 and a retractable hard-top roof 24. Body 22 is further divided into a passenger compartment 26 and a trunk 28. The passenger compartment 26 and trunk 28 are separated by an exterior tulip panel 30 and an interior metallic seat back panel 32. Seat back panel is defined and shown herein as a structural member creating a crosscar plane which separates trunk 28 from passenger compartment 26. Furthermore, a pair of rear wheel houses 34 protrude upwardly and inwardly within trunk 28 and passenger compartment 26. Also, a front header 36 extends transversely across the top of a windshield 38. A storage space 40 is located between a pair of front seats 42 and trunk 28 where rear seats (not shown) may be juxtaposed. Referring to FIGS. 1, 2 and 8, retractable hard-top roof 24 is comprised of a front roof section 50, a rear roof section 52, a retraction mechanism 54 and a guiding mechanism 56.

Front roof 50 is a rigid panel having an outside surface 60 and an inside surface 62 which are longitudinally bordered by a forward edge 64 and rearward edge 66. Front roof 50 further has a latching and alignment mechanism 68 which is disengagably attachable with front header 36 when front and rear roofs 50 and 52, respectively, are in a fully extended position 70. Rear roof 52 has an outside surface 72 and an inside surface 74 bordered by a forward edge 76 and a bottom edge 78. Rear roof 52 is further defined by a pair of forward lower corners 80 and a rearmost portion 82 of bottom edge 78. In its extended position 70 (FIG. 1), bottom edge 78 of rear roof 52 is adjacent with a theoretical surface defined by tulip panel 30 and the substantially horizontal portions of quarter panels 90. Moreover, a tonneau cover 92 is hingeably linked to body 22 of automotive vehicle 20 so as to aesthetically hide a gap between rearmost portion 82 of rear roof 52 and the adjacent tulip and quarter panels respectively, 30 and 90. Front roof 50 and rear roof 52 are pivotably coupled to one another by a hinging device 94. Hinging device 94 is joined to front roof 50 proximate with rearward edge 66 and hinging device 94 is joined to rear roof 52 proximate with forward edge 76. Such a hinging device 94 is disclosed in a co-pending U.S. patent application Ser. No. 08/163,374, now U.S. Pat. No. 5,490,709, which is incorporated by reference herewithin, however, many other non-linkage hinges can be used. Subsequently, when front and rear roofs 50 and 52, respectively, are in a fully retracted position 70', outside surface 60 of front roof 50 is in a horizontally stowed orientation between front seats 42 and trunk 28. In concert therewith, tonneau cover 92 is rotated to a lowered position 100 upon a portion of front roof 50. Accordingly, a significant portion of outside surface 60 of front roof 50 is visible, however, since outside surface 60 has a high quality painted finish it is aesthetically attractive.

Figure 5A:
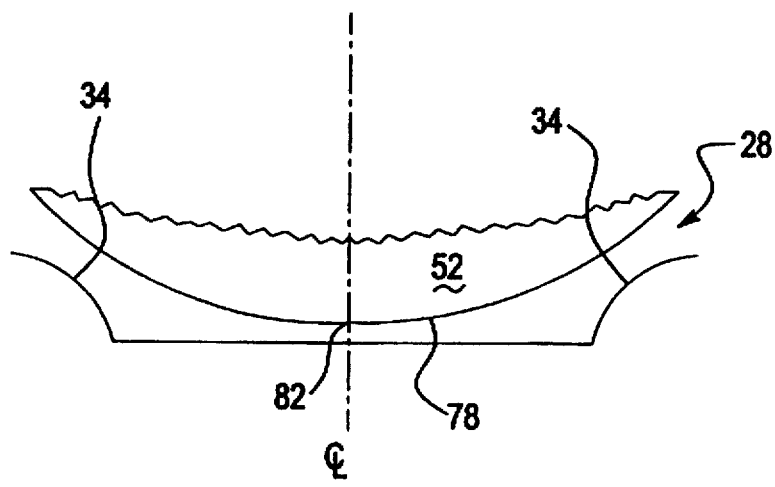
FIG. 5a is a rear diagrammatic view showing the rear roof section clearing a pair of wheel houses during retraction.

Retraction mechanism 54 is mounted within quarter panel 90 of body 22 and the majority of retraction mechanism 54 is transversely external to rearmost portion 82 of rear roof 52. Preferably, a second retraction mechanism (not shown) is symmetrically opposite from first retraction mechanism 54 such that front and rear roofs, respectively 50 and 52 are retractably and extendably controlled by the pair of retraction mechanisms 54 located along each transverse side thereof. Retraction mechanism 54 can best be seen in FIGS. 3–5 and is comprised of a fractional horsepower direct current motor 120, a cam 122, an offset link 124, an intermediate link 126, a balance link 128 and an anchor link 130. Motor 120 has a gear box 140 from which protrudes a pinion gear 142. Motor 120 is mounted upon body 22. Cam 122 has a semi-circular plate 144 with teeth 146 positioned on a peripheral portion thereof. Teeth 146 are in enmeshed engagement with pinion gear 142 of motor 120. An aperture extends through plate 144 of cam 122 and defines a cam pivot portion 148. Cam pivot portion 148 rotates about a pintle 150 attached to body 22. Cam 122 further has an arm 152 projecting therefrom which provides a floating pivot for rear roof 52. Arm 152 has an orifice extending therethrough which defines an arm pivot portion 154. Arm pivot portion 154 is coupled to a tab 156 which projects from rear roof 52 proximate with bottom edge 78. Tab 156 has an orifice extending therethrough thereby providing a rear roof pivot portion 158 coaxially interfacing with arm pivot portion 154.

Offset link 124 has a first end 160 and a second end 162 joined by a median segment 164. First end 160 has an orifice extending therethrough defining a first offset pivot portion 166 which is coupled to tab 156 and arm 152 of cam 122 by a pin or rivet 168. Second end 162 of offset link 124 also has an orifice extending therethrough defining a second offset pivot portion 170. Intermediate link 126 has a first intermediate pivot portion 180 and a second intermediate pivot portion 182 displaced at opposite ends of the part. Second intermediate pivot portion 182 is coaxially coupled to second offset pivot portion 170 of offset link 124. Also, first intermediate pivot portion 180 is pivotably coupled to an anchor pivot portion 184 of anchor link 130. Anchor link 130 is defined by a base segment 186 and an extension segment 188. Base segment 186 is firmly affixed to body 22. Anchor pivot portion 184 is positioned within a distal end 190 of extension segment 188. Furthermore, intermediate link 126 and anchor link 130 are pivotably coupled to one another through a pin or rivet 192.

Balance link 128 has a first balance pivot portion 194 pivotably coupled to intermediate link 126 and offset link 124 through a pin or rivet 196. Balance link 128 further has an upper balance pivot portion 196 which is pivotably coupled to a side rail of front roof 50 adjacent to rearward edge 66 (see FIG. 8).

Guiding mechanism 56 is comprised of a track 220, a second fractional horsepower direct current electric motor 222, a plurality of pulleys 224 and a cable 226. Track 220 has a C-shaped cross sectional configuration and has an arcuate longitudinal orientation. A tang 230 projects from rear roof 52 proximate with bottom edge 78. Tang 230 is also located rearward of tab 156. A carrier 232 is rotatably joined to tang 230 and is slidably engaged within track 220. Motor 222 has a gearbox 234 which drives a male pulley 236 and an adjacent female pulley 238. Male and female pulleys 236 and 238, respectively, cooperate to propel cable 226 in a clockwise or counterclockwise direction. Cable 226 is further suspended between a pair of auxiliary pulleys 240. Tang 230 of rear roof 52 is fastened to a preselected portion of cable 226 through a crimp or an eyelet and pin arrangement such that tang 230 travels in concert with cable 226. Track 220, motor 222, and auxiliary pulleys 240 are mounted upon body 22 outboard of rearmost portion 82 of rear roof 52. Moreover, a second and symmetrically opposite guiding mechanism is located on the opposite transverse side of body 22 and is similarly attached to rear roof 52.

The sequence of retraction steps are shown in FIGS. 6–12. In FIG. 6, front and rear roofs 50 and 52, respectively, are in extended position 70. Accordingly, arm 152 of cam 122 is in a rearmost position. Offset link 124, intermediate link 126, anchor link 130 and balance link 128 are fully extended relative to one another. Thus, tang 230 is in its rearmost position relative to track 220. In this fully extended position 70, a quarter window 300 can also be fully extended as is shown. In FIGS. 7 and 8, retraction mechanism 54 is shown collapsing front roof 50 inwardly upon rear roof 52 through actuation of balance link 128. Simultaneously, cam 122 acts to raise rear roof pivot portion 158 above the nominal extended position 70 with bottom edge 78 being proximate with the substantially horizontal portions of quarter panels 90. Also, carrier 232 and tang 230 maintain the vertical positioning of rearmost portion 82 of rear roof 52 while traversing longitudinally along track 220. Thus, rearmost portion 82 of rear roof 52 can be rotated in a clockwise manner (relative to the orientation of these figures) thereby clearing and passing above and between wheel houses 34 (see FIG. 5a). Front lower corner 80 of rear roof 52 is also rising and moving in a rearward direction in relation to rearmost portion 82 while the entire rear roof 52 is inverted. Quarter window 300 is automatically retracted within rear roof 52 prior to or during rotation. The mechanism used to retract quarter window 300 is disclosed in a co-pending U.S. patent application Ser. No. 08/162,847, now U.S. Pat. No. 5,456,516, which is incorporated by reference herewithin.

Figure 9:
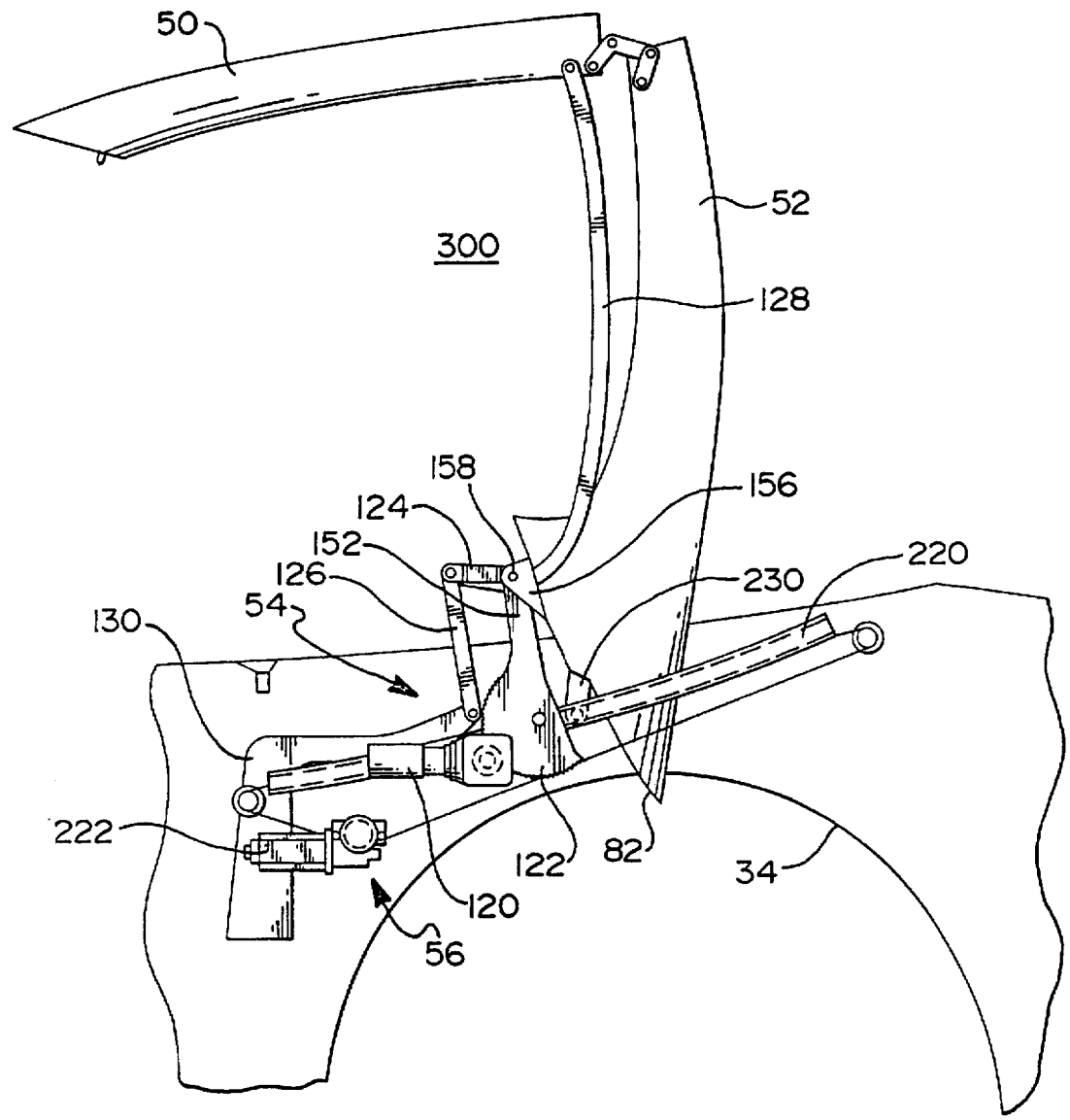

As can be observed in FIG. 9, rear roof 52 is shown in a substantially vertical orientation. At this point, guiding mechanism 56 becomes critical in continuing the inversion of rear roof 52. Furthermore, rear roof pivot portion 158 is located near its highest floating point.

Figure 10:
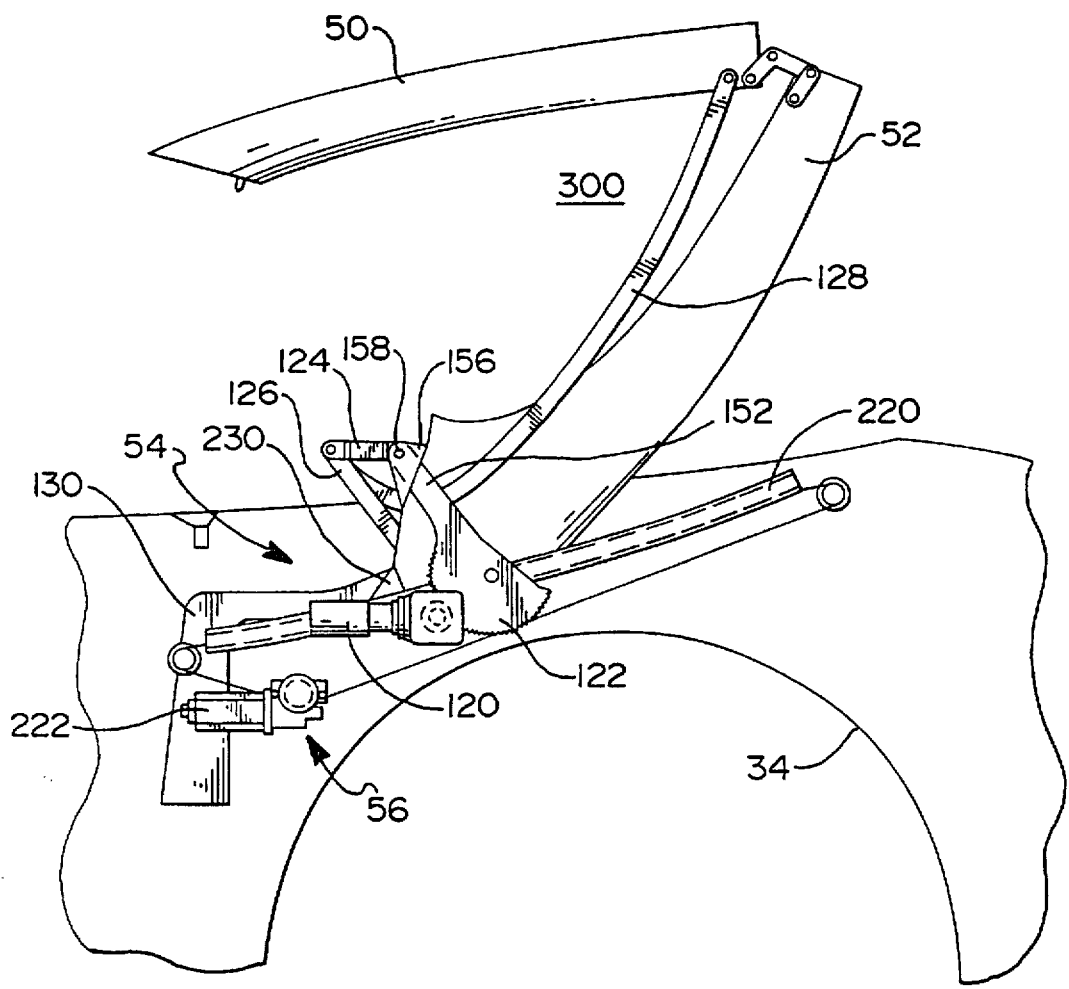
Figure 11:
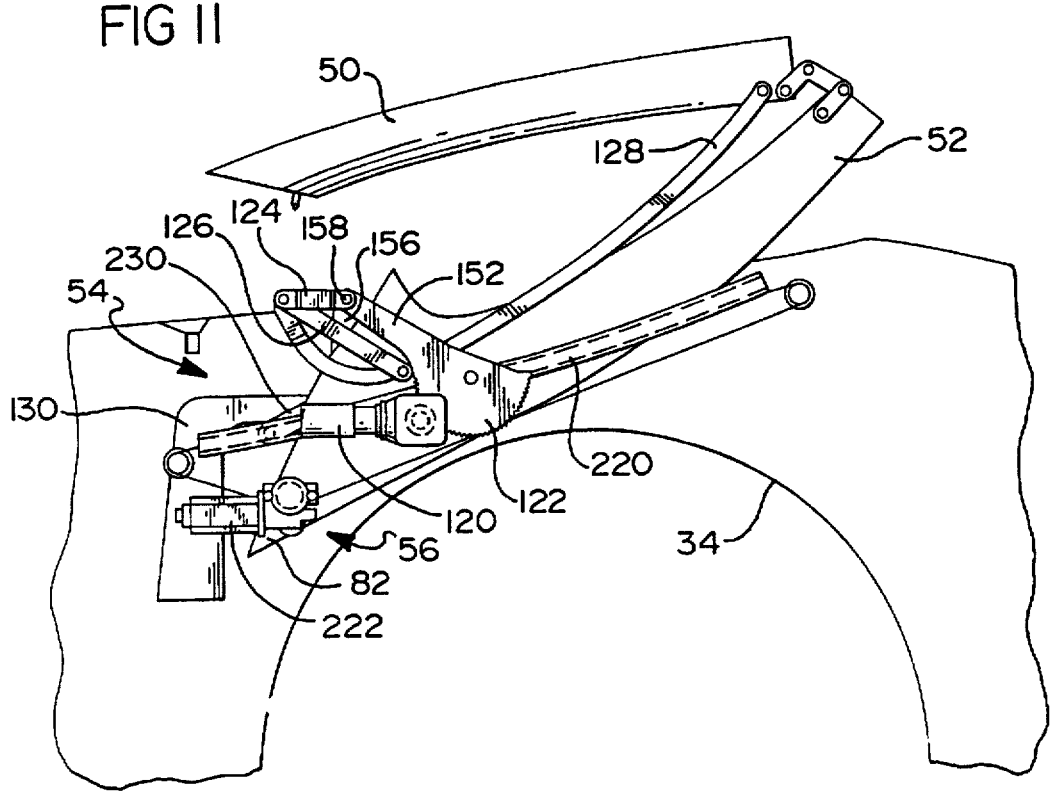
Figure 12:
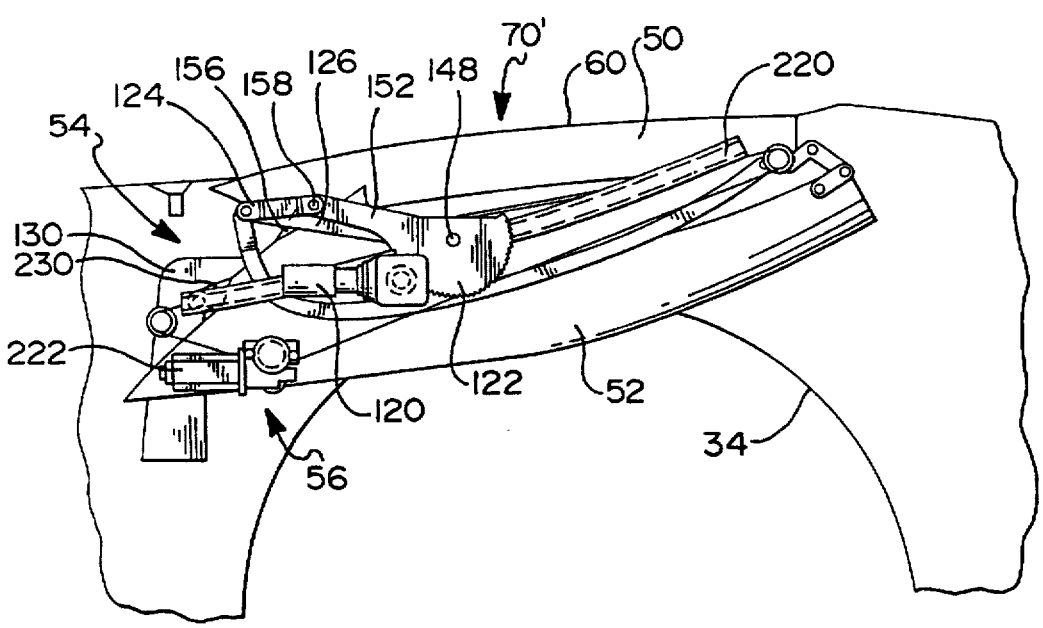

Referring to FIGS. 10 and 11, rear roof pivot portion 158 is lowered as it continues to move in a forward longitudinal direction while rear roof 52 continues to be inverted. Referring to FIG. 12, front roof 50 is shown fully collapsed upon rear roof 52 thereby defining fully stowed or retracted position 70'. Arm 152 of cam 122 is in a forward position relative to cam pivot portion 148. As was previously mentioned, front and rear roofs 50 and 52, respectively, are in a horizontal orientation with outside surface 60 of front roof being exposed from outside automotive vehicle 20 (see FIG. 1). Tonneau cover 92 (see FIG. 2) is then closed upon a portion of front roof 50.

First and second motors 120 and 222, respectively, must be synchronously operated with one another as well as with the associated motors on the opposite side of body 22. This can be accomplished by using an electrical system similar to that disclosed in U.S. Pat. No. 5,225,747 entitled "Single-Button Actuated Self-Correcting Automatic Convertible Top" which issued to Helms et al. on Jul. 6, 1993. This patent is incorporated by reference herewithin.

An alternate embodiment retraction mechanism 320 incorporating the principles of the present invention is illustrated in FIGS. 13–17. A lift link 322 has a proximal end 324 with a lift pivot portion 326. Lift pivot portion 326 is pivotably coupled with body 22 of automotive vehicle 20. Lift link 322 further has a lift joint 328 which is displaced away from lift pivot portion 326 thereby providing a lever therebetween. A bracket 340 and a spur gear 342 are preferably attached to a distal end 344 of lift link 322. A hydraulic strut 330 has a cylinder 332 with a plunger 334 linearly extendable and retractable therefrom. A base 336 of cylinder 332 is pivotably coupled to body 22. In concert therewith, plunger 334 is pivotably coupled with joint 328 of lift link 322. Accordingly, hydraulic strut 330 serves to raise lift link 322 which, in turn, raises rear roof pivot portion 158 attached to rear roof 52. In other words, a floating roof pivot is provided. A fractional horsepower direct current electric motor 350 is attached to rear roof 52 proximate with bottom edge 78. Motor 350 has a pinion gear 352 which is enmeshed with spur gear 342 thereby rotating rear roof 52 about its rear roof pivot portion 158. The sequence of retraction using this alternate embodiment retraction mechanism 320 is substantially similar to that of the preferred embodiment. Moreover, motor 350 could of course be mounted to lift link 322 while spur gear 324 could be affixed to rear roof 52. A cooperating second retraction mechanism is juxtapositioned transversely and symmetrically opposite from the first retraction mechanism 320 shown.

While various embodiments of this retractable hard-top roof have been disclosed, it will be appreciated that various modifications may be made without departing from the present invention. For example, a single motor could be used to operate the symmetrically opposite retraction mechanisms. Similarly, a single motor could be used to operate both symmetrically opposite guiding mechanisms. Furthermore, a scissor arm type linkage mechanism can be used to vertically float the rear roof pivot from a nominal extended position. The front roof could alternately slide over the rear roof rather than folding adjacent thereto. The floating retraction mechanism of the present invention could also be employed with a vertically stowed roof. Moreover, while it is preferred that the front and rear roofs be stowed free of the trunk, of course the trunk could be used to receive the retracted unit. Also, while the retraction mechanism has been described as being located within the automotive vehicle body, it would be obvious to one skilled in the art to located these devices in an opposite manner substantially within the rear roof. It is intended by the following claims to cover these and any other departures from the disclosed embodiments which fall within the true spirit of this invention.

The invention claimed is:

1. A retractable hard-top roof for an automotive vehicle, said automotive vehicle having a body within which is a passenger compartment, said body further having a front windshield, said retractable hard-top roof comprising:

a front roof section disposed above said passenger compartment when in an extended position, said front roof section being substantially rigid;

a rear roof section at least partially disposed above said passenger compartment substantially behind said front roof section when in said extended position, said rear roof section being substantially rigid, said rear roof section substantially extending between said front roof section and said body of said automotive vehicle, said rear roof section being mechanically coupled for relative angular movement to said front roof section; and a retracting mechanism coupling said rear roof section to said body of said automotive vehicle, said retracting mechanism being operable to extend said front roof section toward said front windshield and said rear roof section between said front roof section and said body, said retracting mechanism being further operable to collapse said front roof section in a rearward direction away from said front windshield while moving said rear roof section away from said extended position and collapsing said front roof section thereby defining a retracted position positioned at least partially within said passenger compartment, said front roof section being substantially horizontal when in said retracted position;

said rear roof section including a pivot about which said rear roof section is rotatable when moved from said extended position to said retracted position, said pivot being located near a bottom edge of said rear roof section;

said retraction mechanism lifting said pivot of said rear roof section in a substantially vertical upward direction during retraction of said rear roof section.

2. The retractable hard-top roof of claim 1 wherein:

said pivot is located near a forward bottom corner of said rear roof section such that an upper forward edge of said rear roof rotates substantially rearward and downward when retracted.

3. The retractable hard-top roof of claim 2 further comprising:

a hinge device mechanically coupling said front roof section proximate with said rearward edge to said rear roof section proximate with said forward edge;

said front roof section having an outside surface and an inside surface;

said rear roof section having an outside surface and an inside surface; and said inside surface of said front roof section being foldable upon said inside surface of said rear roof section in a clamshell manner.

4. The retractable hard-top roof of claim 3 wherein:

said front roof section is retractable on top of said rear roof such that said outer surface of said front roof section covers said rear roof section whereby said outside surface of said front roof section is at least partially exposed between a pair of front seats and a trunk of said automotive vehicle.

5. The retractable hard-top roof of claim 2 further comprising:

a guiding mechanism coupled to a portion of said rear roof section near said bottom edge, said guiding mechanism acting in concert with said retracting mechanism so as to rotate said upper forward edge of said rear roof section in a substantially rearward longitudinal direction while rotating a rearmost portion of said bottom edge of said rear roof section in a substantially forward longitudinal direction.

6. The retractable hard-top roof of claim 2 wherein said guiding mechanism includes:

a track having a C-shaped cross sectional configuration; and a carrier mounted upon said rear roof proximate with said bottom edge and located rearward of said rear roof pivot, said carrier engagably moving in said track.

7. The retractable hard-top roof of claim 6 wherein said guiding mechanism further includes:

a guiding electric motor;

a cable drivably connected to said guiding electric motor; and a plurality of pulleys attached to said automotive vehicle body;

said carrier being attached to said cable such that said guiding electric motor moves said carrier when said cable is driven.

8. The retractable hard-top roof of claim 5 further comprising:

a second guiding mechanism juxtapositioned transversely opposite from said first guiding mechanism within said automotive vehicle body, said first and second guiding mechanisms being substantially symmetrical to one another and cooperatively operating in unison.

9. The retractable hard-top roof of claim 1 wherein said retraction mechanism includes:

a retracting electric motor.

10. A retractable hard-top roof for an automotive vehicle, said automotive vehicle having a body within which is a passenger compartment, said body further having a front windshield, said retractable hard-top roof comprising:

a front roof section disposed above said passenger compartment when in an extended position, said front roof section being substantially rigid;

a rear roof section at least partially disposed above said passenger compartment substantially behind said front roof section when in said extending position, said rear roof section being substantially rigid, said rear roof section substantially extending between said front roof section and said body of said automotive vehicle, said rear roof section being mechanically coupled for relative angular movement to said front roof section;

a retracting mechanism coupling said rear roof section to said body of said automotive vehicle, said retracting mechanism being operable to extend said front roof section toward said front windshield and said rear roof section between said front roof section and said body, said retracting mechanism being further operable to collapse said front roof section in a rearward direction away from said front windshield while moving said rear roof section away from said extended position and collapsing said front roof section thereby defining a retracted position located at least partially within said passenger compartment, said front roof section being substantially horizontal when in said retracted position, said retraction mechanism including a retracting electric motor;

a cam of said retraction mechanism having an arm segment, a toothed segment and a cam pivot; and a roof pivot engagement portion of said arm segment coupled with said roof pivot;

said retracting electric motor enmeshing with said toothed segment of said cam so as to drive said arm segment about said cam pivot, said cam serving to lift said roof pivot in a substantially upward, forward and then downward path during retraction of said rear roof section attached to said cam.

11. The retractable hard-top roof of claim 10 further comprising:

a balance link coupled with said front roof section and said retraction mechanism such that said front roof section is rotatably collapsed against said rear roof section during retraction.

12. The retractable hard-top roof of claim 11 wherein said retraction mechanism further includes:

an anchor link affixed to said automotive vehicle body, an arm of said anchor link having a pivot engagement portion;

an intermediate link having a first intermediate pivot portion and a second intermediate pivot portion, said first intermediate pivot portion being rotatably coupled to said anchor pivot portion;

an offset link having a first offset pivot portion and a second offset pivot portion, said first offset pivot portion being rotatably coupled with said second intermediate pivot portion, said second offset pivot portion being rotatably coupled with said arm pivot portion of said cam; and a lower pivot portion of said balance link rotatably coupled with said second intermediate pivot portion and said first offset pivot portion, a second pivot portion of said balance link rotatably coupled with said front roof section;

said retracting electric motor providing rotational movement to said arm segment of said cam which rotates said offset link while moving said rear roof section, said offset link rotating said intermediate link and said balance link, said intermediate link further guiding the rotational movement of said balance link due to restrictions of travel by said anchor link, said balance link thereby rotating said front roof section during retraction and extension.

13. The retractable hard-top roof of claim 1 further comprising:

a tonneau cover pivotably coupled to said automotive vehicle body, said tonneau cover pivotable from a lowered and substantially horizontal position to a raised and substantially vertical position, said tonneau cover located in said raised position during retraction and extension of said front and rear roof sections, said tonneau cover located in said lowered position when said front and rear roof sections are fully extended and fully retracted, said tonneau cover aesthetically covering a gap between said rear roof section and said automotive vehicle body proximate with a trunk when said rear roof section is extended, said tonneau cover aesthetically covering another gap between said outside surface of said front roof section and said automotive vehicle body proximate with said trunk when said front and rear roof sections are fully retracted.

14. The retractable hard-top roof of claim 1 wherein said retraction mechanism includes:

a lift link having a first pivot portion coupled to said automotive vehicle body, a second pivot portion of said lift link displaced a predetermined distance away from said first pivot portion;

a pressurizable strut having a plunger, a portion of said strut coupled to said automotive vehicle body, a portion of said plunger external to said strut rotatably coupled to said second pivot portion of said lift link;

a spur gear having a tooth segment mounted upon said lift link disposed away from said first pivot portion; and a driving gear;

a pair of wheel houses; and an electric motor driving said driving gear, said driving gear enmeshing with said toothed segment of said spur gear, said electric motor being mounted upon said rear roof section adjacent to a bottom edge, said electric motor rotating said rear roof section about said spur gear and said lift link when said rear roof section is being retracted and extended, said strut and said plunger being operable to raise said distal portion of said lift link during extension and retraction of said rear roof section such that a rearmost portion of said bottom edge of said rear roof section clears said pair of wheel houses of said automotive vehicle.

15. The retractable hard-top roof of claim 1 wherein said retraction mechanism includes:

a lift link having a first pivot portion coupled to said automotive vehicle body, a second pivot portion of said lift link displaced a predetermined distance away from said first pivot portion;

a pressurizable strut having a slidable plunger, a portion of said strut coupled to said automotive vehicle body, a portion of said plunger external to said strut rotatably coupled to said second pivot portion of said lift link;

a spur gear having a tooth segment mounted upon said rear roof section adjacent to a bottom edge;

a driving gear; and an electric motor driving said driving gear, said driving gear enmeshing with said toothed segment of said spur gear, said electric motor being mounted upon said lift link, said electric motor rotating said rear roof section about said spur gear and said lift link when said rear roof section is being retracted and extended, said strut and said plunger being operable to raise said distal portion of said lift link during extension and retraction of said rear roof section such that a rearmost portion of said bottom edge of said rear roof section clears a pair of wheel houses of said automotive vehicle.

16. The retractable hard-top roof of claim 1 further comprising:

a pair of quarter windows retractable into said rear roof section.

17. The retractable hard-top roof of claim 1 further comprising:

a second retraction mechanism juxtapositioned transversely opposite from said first retraction mechanism against said automotive vehicle body, said first and second retraction mechanisms being substantially symmetrical to one another and cooperatively operating in unison.

18. A retractable roof for an automotive vehicle, said automotive vehicle having a body within which is a passenger compartment, said body further having a front windshield, said retractable roof comprising:

a front roof section disposed above said passenger compartment when in an extended position;

a rear roof section at least partially disposed above said passenger compartment substantially behind said front roof section when in said extending position;

a retracting mechanism coupling said rear roof section to said body of said automotive vehicle, said retracting mechanism being operable to extend said front roof section toward said front windshield and said rear roof section between said front roof section and said body, said retracting mechanism being further operable to collapse said front roof section in a rearward direction away from said front windshield while moving said rear roof section away from said extended position and collapsing said front roof section thereby defining a retracted position;

a pivot of said rear roof section lifted by said retracting mechanism in a substantially vertical upward direction during retraction of said rear roof section;

said rear roof section being rotatable about said pivot when moved from said extended position to said retracted position, said pivot being located near a bottom edge of said rear roof section, said pivot also being located near a forward bottom corner of said rear roof section such that an upper forward edge of said rear roof rotates substantially rearward and downward when retracted; and a guiding mechanism coupled to a portion of said rear roof section near said bottom edge, said guiding mechanism acting in concert with said retracting mechanism so as to rotate said upper forward edge of said rear roof section in a substantially rearward longitudinal direction while rotating a rearmost portion of said bottom edge of said rear roof section in a substantially forward longitudinal direction.

19. A retractable roof for an automotive vehicle, said automotive vehicle having a body within which is a passenger compartment, said body further having a front windshield, said retractable roof comprising:

a front roof section disposed above said passenger compartment when in an extended position;

a rear roof section at least partially disposed above said passenger compartment substantially behind said front roof section when in said extending position;

a retracting mechanism coupling said rear roof section to said body of said automotive vehicle, said retracting mechanism being operable to extend said front roof section toward said front windshield and said rear roof section between said front roof section and said body, said retracting mechanism being further operable to collapse said front roof section in a rearward direction away from said front windshield while moving said rear roof section away from said extended position and collapsing said front roof section thereby defining a retracted position;

an electric motor; and a pivot of said rear roof section lifted by said electric motor in a substantially vertical upward direction during retraction of said rear roof section;

a cam having an arm segment, a toothed segment and a cam pivot; and a roof pivot engagement portion of said arm segment coupled with said roof pivot;

said electric motor enmeshing with said toothed segment of said cam so as to drive said arm segment about said cam pivot, said cam serving to lift said roof pivot in a substantially upward, forward and then downward path during retraction of said rear roof section.

20. The retractable roof of claim 19 wherein:

said rear roof section includes said pivot about which said rear roof section is rotatable when moved from said extended position to said retracted position thereof, said pivot located near a bottom edge of said rear roof section.

21. The retractable roof of claim 20 wherein:

said pivot is located near a forward bottom corner of said rear roof section such that an upper forward edge of said rear roof rotates substantially rearward and downward when retracted.

22. The retractable roof of claim 21 further comprising:

said front roof section having an outside surface and an inside surface;

said rear roof section having an outside surface and an inside surface; and a hinge device coupling said front roof section proximate with said rearward edge to said rear roof section proximate with said forward edge;

said inside surface of said front roof section being foldable upon said inside surface of said rear roof section in a clamshell manner.

23. The retractable roof of claim 22 wherein:

said front roof section is retractable on top of said rear roof such that said outer surface of said front roof section covers said rear roof section whereby said outside surface of said front roof section is at least partially exposed between a pair of front seats and a trunk of said automotive vehicle.

24. The retractable roof of claim 21 further comprising:

a guiding mechanism coupled to a portion of said rear roof section near said bottom edge, said guiding mechanism acting in concert with said retracting mechanism so as to rotate said upper forward edge of said rear roof section in a substantially rearward longitudinal direction while rotating a rearmost portion of said bottom edge of said rear roof section in a substantially forward longitudinal direction.

25. The retractable roof of claim 24 wherein said guiding mechanism includes:

a track having a C-shaped cross sectional configuration; and a carrier mounted upon said rear roof proximate with said bottom edge and located rearward of said rear roof pivot, said carrier engagably moving within said track.

26. The retractable roof of claim 25 wherein said guiding mechanism further includes:

a guiding electric motor;

a cable drivably connected to said guiding electric motor; and a plurality of pulleys attached to said automotive vehicle body;

said carrier being attached to said cable such that said guiding electric motor moves said carrier when said cable is driven.

27. The retractable roof of claim 24 further comprising:

a second guiding mechanism juxtapositioned transversely opposite from said first guiding mechanism within said automotive vehicle body, said first and second guiding mechanisms being substantially symmetrical to one another and cooperatively operating in unison.

28. The retractable roof of claim 18 wherein said retraction mechanism includes:

a retracting electric motor.

29. The retractable roof of claim 19 further comprising:

a balance link coupled with said front roof section and said retraction mechanism such that said front roof section is rotatably collapsed against said rear roof section during retraction.

30. The retractable roof of claim 29 wherein said retraction mechanism further includes:

an anchor link affixed to said automotive vehicle body, an arm of said anchor link having a pivot engagement portion;

an intermediate link having a first intermediate pivot portion and a second intermediate pivot portion, said first intermediate pivot portion being rotatably coupled to said anchor pivot portion;

an offset link having a first offset pivot portion and a second offset pivot portion, said first offset pivot portion being rotatably coupled to said second intermediate pivot portion, said second offset pivot portion being rotatably coupled to said arm pivot portion of said cam; and a lower pivot portion of said balance link rotatably coupled to said second intermediate pivot portion and said first offset pivot portion, a second pivot portion of said balance link rotatably coupled to said front roof section;

said retracting electric motor providing rotational movement to said arm segment of said cam which rotates said offset link while moving said rear roof section, said offset link rotating said intermediate link and said balance link, said intermediate link further guiding the rotational movement of said balance link due to restrictions of travel by said anchor link, said balance link thereby rotating said front roof section during retraction and extension.

31. The retractable roof of claim 18 further comprising:

a tonneau cover coupled to said automotive vehicle body, said tonneau cover movable from a lowered and substantially horizontal position to a raised and substantially vertical position, said tonneau cover located in said raised position during retraction and extension of said front and rear roof sections, said tonneau cover located in said lowered position when said front and rear roof sections are fully extended and fully retracted, said tonneau cover aesthetically covering a gap between said rear roof section and said automotive vehicle body proximate with said trunk when said rear roof section is extended, said tonneau cover aesthetically covering another gap between said outside surface of said front roof section and said automotive vehicle body proximate with a trunk when said front and rear roof sections are fully retracted.

32. The retractable roof of claim 18 wherein said retraction mechanism includes:

a lift link having a first pivot portion coupled to said automotive vehicle body, a second pivot portion of said lift link displaced a predetermined distance away from said first pivot portion;

a pressurizable strut having a plunger, a portion of said strut coupled to said automotive vehicle body, a portion of said plunger external to said strut rotatably coupled to said second pivot portion of said lift link;

a spur gear having a tooth segment mounted upon said lift link disposed away from said first pivot portion;

a driving gear; and an electric motor driving said driving gear, said driving gear enmeshing with said toothed segment of said spur gear, said electric motor being mounted upon said rear roof section adjacent to a bottom edge, said electric motor rotating said rear roof section about said spur gear and said lift link when said rear roof section is being retracted and extended, said strut and said plunger being operable to raise said distal portion of said lift link during extension and retraction of said rear roof section such that a rearmost portion of said bottom edge of said rear roof section clears a pair of wheel houses of said automotive vehicle.

33. The retractable roof of claim 18 wherein said retraction mechanism includes:

a lift link having a first pivot portion coupled to said automotive vehicle body, a second pivot portion of said lift link displaced a predetermined distance away from said first pivot portion;

a pressurizable strut having a plunger, a portion of said strut coupled to said automotive vehicle body, a portion of said plunger external to said strut rotatably coupled to said second pivot portion of said lift link;

a spur gear having a tooth segment mounted upon said rear roof section adjacent to a bottom edge;

a driving gear; and an electric motor driving said driving gear, said driving gear enmeshing with said toothed segment of said spur gear, said electric motor being mounted upon said lift link, said electric motor rotating said rear roof section about said spur gear and said lift link when said rear roof section is being retracted and extended, said strut and said plunger being operable to raise said distal portion of said lift link during extension and retraction of said rear roof section such that a rearmost portion of said bottom edge of said rear roof section clears a pair of wheel houses of said automotive vehicle.

34. The retractable roof of claim 18 further comprising:

a pair of quarter windows retractable into said rear roof section.

35. The retractable roof of claim 18 further comprising:

a second retraction mechanism juxtapositioned transversely opposite from said first retraction mechanism against said automotive vehicle body, said first and second retraction mechanisms being substantially symmetrical to one another and cooperatively operating in unison.

36. The retractable roof of claim 18 wherein:

said front roof section is substantially rigid.

37. The retractable roof of claim 18 wherein:

said rear roof section is substantially rigid.

38. A retractable hard-top roof for an automotive vehicle, said automotive vehicle having a body within which is a passenger compartment, a pair of front seats and a trunk, a pair of rear wheel houses disposed in said body, a front header of said body located above a front windshield, said retractable hard-top roof comprising:

a front roof section disposed above said passenger compartment, a portion of said front roof section disengagably coupled to said front header when in an extended position, said front roof section being substantially rigid and having an outside surface and an inside surface;

a rear roof section at least partially disposed above said passenger compartment substantially behind said front roof section when in said extending position, said rear roof section further having an outside surface and an inside surface, said rear roof section being foldably coupled to said front roof section by a hinging device, said hinge device coupling said front roof section proximate with a rearward edge to said rear roof section proximate with a forward edge, said inside surface of said front roof section being foldable upon said inside surface of said rear roof section in a clamshell manner such that said outer surface of said front roof section covers said rear roof section whereby said outside surface of said front roof section is at least partially exposed between said pair of front seats and said trunk of said automotive vehicle, a pivot of said rear roof section, said rear roof section being rotatable about said pivot when moved from said extended position to a retracted position, said pivot being located near a forward bottom corner of said rear roof section such that an upper forward edge of said rear roof rotates substantially rearward and downward when retracted;

a retracting mechanism coupling said rear roof section to said body of said automotive vehicle, said retracting mechanism being operable to extend said front roof section toward said front header and said rear roof section between said front roof section and said body, said retracting mechanism being further operable to collapse said front roof section in a rearward direction away from said front header while moving said rear roof section away from said extended position thereby collapsing said front roof section substantially against said rear roof section thereby defining said retracted position, said front roof section and said rear roof section being substantially horizontal when in said retracted position, said retraction mechanism lifting said pivot of said rear roof section in a substantially vertical upward direction during retraction of said rear roof section, said rearmost portion of said bottom edge rotatably clearing said pair of rear wheel houses of said automotive vehicle during retraction and extension;

an electric motor;

a cam having an arm segment and a toothed segment, said cam also having a cam pivot, a roof pivot engagement portion of said arm segment coupled with said roof pivot, said electric motor enmeshing with said toothed segment of said cam so as to drive said arm segment about said cam pivot, said cam serving to lift said roof pivot in a substantially upward, forward and then downward path during retraction of said rear roof section;

a guiding mechanism coupled to a portion of said rear roof section near said bottom edge, said guiding mechanism acting in concert with said retracting mechanism so as to rotate said forward edge of said rear roof section in a substantially rearward longitudinal direction while rotating a rearmost portion of said bottom edge of said rear roof section in a substantially forward longitudinal direction; and a tonneau cover pivotably coupled to said automotive vehicle body, said tonneau cover being pivotable from a lowered and substantially horizontal position to a raised and substantially vertical position, said tonneau cover being located in said raised position during retraction and extension of said front and rear roof sections, said tonneau cover being located in said lowered position when said front and rear roof sections are fully extended and fully retracted, said tonneau cover aesthetically covering a gap between said rear roof section and said automotive vehicle body proximate with said trunk when said rear roof section is extended, said tonneau cover aesthetically covering another gap between said outside surface of said front roof section and said automotive vehicle body proximate with said trunk when said front and rear roof sections are fully retracted.

39. An apparatus for an automotive vehicle, said apparatus comprising:

a retractable hard-top roof including a rigid front roof section and a rigid rear roof section, said front roof section being inwardly foldable in a clamshelling manner against said rear roof section during retraction;

a sector gear drivably coupled to said rear roof section; and an electric motor having an output gear directly and driveably enmeshed with said sector gear;

an elongated arm extending from said sector gear, said arm being pivotably coupled to said rear roof section.

40. The apparatus of claim 39 wherein said output gear of said motor is a spur-type pinion gear.

41. The apparatus of claim 39 further comprising a substantially rigid balance link coupled to said front roof section.

42. The apparatus of claim 39 further comprising a member movably coupling said balance link to said sector gear.

43. A retractable roof for an automotive vehicle, said automotive vehicle having a trunk, said retractable roof comprising:

a front roof section;

a rear roof section disposed substantially behind said front roof section when said roof sections are in extended positions, said rear roof section always being mechanically and movably coupled to said front roof section once installed in said vehicle;

a pivot pin coupled to said rear roof section;

a retraction mechanism driving said roof sections between retracted positions and said extended positions;

a longitudinally elongated guiding mechanism controlling retraction of a portion of said rear roof section, said rear roof section being slidably coupled to said guiding mechanism;

a balance link controlling retraction of a portion of said front roof section;

said front roof section and said rear roof section being collapsible away from said extended positions by actuation of said retraction mechanism, said retracted position of at least said front roof section being disposed at least partially forward of said trunk, said front roof section being substantially horizontal when in said retracted position; and a movable cover covering at least a portion of said front roof section when said front roof section is disposed in said retracted and substantially horizontal position.

44. The roof of claim 43 wherein said cover includes a rigid tonneau cover movably coupled to said vehicle body in an upwardly pivoting manner.

45. The roof of claim 43 wherein said cover only covers a rearward portion of said front roof section when in said retracted position thereby leaving a forward portion of said front roof section exposed.

46. The roof of claim 43 further comprising:

a trunk lid being movably coupled to said vehicle body;

said cover including a rigid tonneau cover movably coupled to said vehicle body and operable independent from said trunk lid.

47. The roof of claim 43 wherein said front and rear roof sections are rigid.

48. The roof of claim 43 further comprising a front passenger seat, said front roof section being entirely disposed between said front passenger seat and said trunk when said front roof section is in said retracted position, a majority of an exterior surface of said front roof section being visible when in said retracted position, said movable cover having a substantially C-shaped forward edge when viewed from above, said rear roof section pivoting about said pivot pin disposed adjacent to a forward and bottom edge of said rear roof section.

49. A retractable roof for use in an automotive vehicle, said roof comprising:

a front roof section;

a rear roof section coupled to and disposed substantially behind said front roof section when said front roof section is in a front roof extended position, an inside surface of said front roof section foldable upon an inside surface of said rear roof section in a clamshelling manner;

a pivot disposed on a rear half of said rear roof section as viewed when said rear roof section is in an extended position; and a retracting mechanism coupled to said rear roof section, said retracting mechanism being operable to extend said front roof section and said rear roof section, said retracting mechanism being further operable to collapse said front roof section in a rearward direction while moving said rear roof section away from said rear roof extended position thereby defining a retracted position of said roof sections;

said retracting mechanism lifting said pivot of said rear roof section in a substantially vertical upward direction during retraction of said rear roof section.

50. The roof of claim 49 further comprising an electric motor having a spur-type gear enmeshably driving said retracting mechanism.

51. The roof of claim 49 wherein said front and rear roof sections are rigid, said retracting mechanism further including an electric motor driven cable and pulley system, said cable being coupled to said rear roof section, a balance link of said retracting mechanism coupled to said front roof section.

52. A retractable roof system for an automotive vehicle, said roof system comprising:

a front roof section;

a rear roof section disposed substantially behind said front roof section when said roof sections are in extended positions, said rear roof section being mechanically and movably coupled to said front roof section;

said front roof section and said rear roof section being collapsible away from said extended positions, said front roof section being substantially horizontal when in a retracted position;

a retracted roof storage space; and a cover moving from a covering position substantially above at least a portion of said retracted roof storage space to an uncovering position so as to at least partially expose said retracted roof storage space for receiving at least one of said roof sections, said movable cover only covering a rearward portion of said front roof section when said front roof section is disposed in said retracted and substantially horizontal position and when said movable cover is moved back over said at least a portion of said retracted roof storage space thereby leaving a forward portion of said front roof section exposed said front roof section acting to cover at least a forward portion of said retracted roof storage space when said front roof section is in said retracted position.

53. The roof system of claim 52 further comprising an inner surface of said front roof section folding in a clamshelling manner upon an inner surface of said rear roof section.

54. The roof system of claim 52 further comprising a pivot located near a forward bottom corner of said rear roof section, said rear roof section being a hard top roof section.

55. The roof system of claim 52 further comprising a pivot pin and a front passenger seat, said front roof section being entirely disposed between said front passenger seat and said trunk when said front roof section is in said retracted position, a majority of an exterior surface of said front roof section being visible when in said retracted position, said movable cover having a substantially C-shaped forward edge when viewed from above, said rear roof section pivoting about said pivot pin disposed adjacent to a forward and bottom edge of said rear roof section.

56. The roof of claim 52 wherein said front and rear roof system sections are rigid.

57. An automotive vehicle apparatus comprising:

a front roof section;

a rear roof section coupled to said front roof section, said roof sections being collapsible away from their extended positions, said front roof section being substantially horizontal when in a retracted position;

a trunk covered by a trunk lid;

a front seat;

a retracted roof storage space located forward of said trunk and rearward of said front seat; and a rigid tonneau cover pivoting from a covering position substantially above at least a portion of said retracted roof storage space to an uncovering position so as to at least partially expose said retracted roof storage space for receiving at least one of said roof sections, said tonneau cover only covering a rearward portion of said front roof section when said front roof section is disposed in said retracted and substantially horizontal position and when said tonneau cover is disposed in said covering position thereby leaving a forward portion of said front roof section exposed to view from outside of said vehicle;

wherein said roof sections are stowed forward of said trunk in said retracted roof storage space, said front roof section acts to cover at least a forward portion of said retracted roof storage space when said front roof section is in said retracted position.

58. The automotive vehicle apparatus of claim 57 wherein said front roof section is substantially rigid.

59. The automotive vehicle apparatus of claim 57 further comprising an outside surface of said front roof section being substantially flush with a substantially horizontal outside surface of said trunk lid when said front roof section is in said retracted position.

60. The automotive vehicle apparatus of claim 57 further comprising inside surfaces of said roof sections being substantially hidden from view when said roof sections are disposed in said retracted positions.

61. The roof system of claim 52 where said front roof section is substantially rigid.

62. The roof system of claim 52 further comprising:

a trunk located behind said retracted roof storage space;

a trunk lid covering said trunk; and an outside surface of said front roof section being substantially flush with a substantially horizontal outside surface of said trunk lid when said front roof section is in said retracted position.

63. The roof system of claim 52 further comprising inside surfaces of said roof sections being substantially hidden from view when said roof sections are disposed in said retracted positions.

* * * * *

UNITED STATES PATENT AND TRADEMARK OFFICE
CERTIFICATE OF CORRECTION

PATENT NO. : 5,785,375　　　　　　　　Page 1 of 2
DATED : July 28, 1998
INVENTOR(S) : Michael P. Alexander et al It is certified that error appears in the above-indentified patent and that said Letters Patent is hereby corrected as shown below:

Column 5, line 60, "located" should be -- locate --.

Column 7, line 5, "2" should be -- 5 --.

Column 7, line 43, "extending" should be -- extended --.

Column 9, line 65, "extending" should be -- extended --.

Column 10, line 10, "of" should be -- on --.

Column 10, line 36, "extending" should be -- extended --.

Column 13, line 49, "of" should be -- on --.

Column 13, line 59, "extending" should be -- extended --.

Column 13, line 64, "with a" should be -- its --.

Column 13, line 65, "with a" should be -- its --.

Column 14, line 5, "of" (second occurrence) should be -- on --.

Column 15, line 16, "39" should be -- 41 --.

Column 16, line 13, "clamshelling" should be -- clamshell --.

UNITED STATES PATENT AND TRADEMARK OFFICE
CERTIFICATE OF CORRECTION

PATENT NO. : 5,785,375
DATED : July 28, 1998
INVENTOR(S) : Michael P. Alexander et al It is certified that error appears in the above-indentified patent and that said Letters Patent is hereby corrected as shown below:

Column 18, line 6, "acts" should be -- acting --.

Signed and Sealed this

Second Day of March, 1999

Attest:

Q. TODD DICKINSON

Attesting Officer

Acting Commissioner of Patents and Trademarks